(12) United States Patent
Bailey et al.

(10) Patent No.: US 8,701,897 B2
(45) Date of Patent: Apr. 22, 2014

(54) CABLE EXTENSION MODULE

(75) Inventors: Sean Bailey, Houston, TX (US); Gary Craig, Houston, TX (US); Padira Reddy, Houston, TX (US)

(73) Assignee: Nabors International, Inc., Houston, TX (US)

( * ) Notice: Subject to any disclaimer, the term of this patent is extended or adjusted under 35 U.S.C. 154(b) by 364 days.

(21) Appl. No.: 13/222,334

(22) Filed: Aug. 31, 2011

(65) Prior Publication Data
US 2013/0048580 A1    Feb. 28, 2013

(51) Int. Cl.
*H01B 7/06* (2006.01)

(52) U.S. Cl.
USPC ............. 211/1.56; 174/69; 137/615; 312/297

(58) Field of Classification Search
USPC ........ 211/1.56, 90.02, 121, 122, 126.15, 151;
248/65, 68.1, 70, 73; 312/139.2, 297;
191/12 R, 12 S; 59/78.1; 160/35, 36,
160/193; 137/355.16, 355.2, 355.21,
137/355.28, 615; 108/67; 174/69
See application file for complete search history.

(56) References Cited

U.S. PATENT DOCUMENTS

| 2,462,410 A | * | 2/1949 | Lindenblad | 333/156 |
|---|---|---|---|---|
| 2,865,979 A | * | 12/1958 | Klassen | 174/69 |
| 3,199,576 A | * | 8/1965 | Jericijo | 160/193 |
| 3,219,750 A | * | 11/1965 | Davies | 174/69 |
| 3,281,080 A | * | 10/1966 | Hogg | 239/733 |
| 3,284,036 A | * | 11/1966 | Nansel | 248/49 |
| 3,335,326 A | * | 8/1967 | Bonin et al. | 361/827 |
| 3,399,909 A | * | 9/1968 | Ambrose | 285/61 |
| 3,525,483 A | | 8/1970 | Van Alstyne | |
| 3,647,936 A | * | 3/1972 | Dryg | 174/69 |
| 3,676,572 A | * | 7/1972 | Davies | 174/69 |
| 3,700,833 A | * | 10/1972 | Behme | 191/12 R |
| 4,391,297 A | * | 7/1983 | Knight | 137/615 |
| 5,417,486 A | | 5/1995 | Manlove | |
| 5,443,312 A | | 8/1995 | Schluter | |
| 5,746,389 A | * | 5/1998 | Willmann | 242/615.1 |
| 6,378,956 B1 | | 4/2002 | Van De Walker | |
| 6,427,982 B1 | | 8/2002 | Sugimachi | |
| 6,675,720 B2 | * | 1/2004 | Peterson et al. | 104/196 |

FOREIGN PATENT DOCUMENTS

EP            937669 A1  *  8/1999 ............ B65G 69/00

OTHER PUBLICATIONS

International Search Report and Written Opinion for International Application No. PCT/US2012/052479, mailed on Nov. 15, 2012 (11 pages).

* cited by examiner

*Primary Examiner* — Joshua Rodden
(74) *Attorney, Agent, or Firm* — Adolph Locklar

(57) ABSTRACT

In one embodiment, a cable extension mechanism includes a housing and a plurality of cable tray segments adapted to retain elongate material therein, wherein each cable tray segment includes first and second cable trays. A sheave is disposed on an axle between the first and second cable trays thereby forming an extendable elbow. At least one wheel assembly is coupled to each cable tray segment to enable the tray segment to articulate between a first position wherein the elongate material is stored and has a first length shorter than an actual length of the elongate material and a substantially flat second position, thereby extending a length of the elongate material disposed thereon.

7 Claims, 3 Drawing Sheets

CABLE EXTENSION MODULE

BACKGROUND

Construction practice and oil field services commonly require the need to dispense large quantities of spooled or coiled elongate materials. However, construction site conditions often provide unique challenges due to terrain features, impediments and difficulties for the transportation and efficient installation of such materials.

Various devices are known for storing and/or dispensing cable and other types of elongate materials. The present disclosure relates to a mobile mechanism for hands free storage, transportation and deployment of electrical cables, ropes, hoses, or other items. Specifically, the present disclosure relates to a mobile mechanism which includes an apparatus for selectively retracting and extending electrical cables, ropes, hoses, and other items for example, thereon.

Some of the known devices include reel assemblies wherein elongate material is wound on a spool or a reel disposed in a container. In such devices, the user dispenses elongate material by pulling on the free end of the material. However, when the user stops pulling, the spool may continue to rotate due to the momentum of the rotating spool and material. Therefore, the spool may continue to dispense the elongate material from the spool and cause the elongate material to become trapped between the spool and the container, or to become tangled with itself. Further, the elongate material may also become wrapped around the spool or its internal support thereby creating a material jam and becoming a potential safety hazard or may result in a twist or kink that may damage the elongate material.

Festooning cables may also result in a loss of elongate material length thereby increasing project costs where a user needs to use more cable than is ordinarily required to traverse a given distance. The loss in length results from the kinks and twists that may occur in a festooning cable.

A need exists for elongate material dispensers that are capable of dispensing large quantities of elongate material without significant loss of length due to curls in the elongate material that may be a result of spooled or coiled storage. Further, there exists a need for a dispenser that offers collapsibility and is easy to transport to and around challenging terrains such as construction sites and oil rigs.

SUMMARY OF THE INVENTION

In one embodiment, a cable extension mechanism includes a housing and a plurality of cable tray segments adapted to retain elongate material therein, wherein each cable tray segment includes first and second cable trays. A sheave is disposed on an axle between the first and second cable trays thereby forming an extendable elbow. At least one wheel assembly is coupled to each cable tray segment to enable the tray segment to articulate between a first position wherein the elongate material is stored and has a first length shorter than an actual length of the elongate material and a substantially flat second position, thereby extending a length of the elongate material disposed thereon.

In another embodiment, a cable extension mechanism includes a housing and a plurality of cable tray segments adapted to retain elongate material therein, wherein each cable tray segment includes first and second cable trays. A sheave is disposed on an axle between the first and second cable trays thereby forming an extendable elbow. At least one wheel assembly is coupled to each cable tray segment to enable the tray segment to articulate between a first position wherein the elongate material is stored and has a first length shorter than an actual length of the elongate material and a substantially flat second position, thereby extending a length of the elongate material disposed thereon. A pulley system that is operably controlled by a geared motor to retract at least tray segment.

In yet another embodiment, a cable extension mechanism includes a housing and a plurality of cable tray segments adapted to retain elongate material therein, wherein each cable tray segment includes first and second cable trays. A sheave is disposed on an axle between the first and second cable trays thereby forming an extendable elbow. At least one wheel assembly coupled to each cable tray segment to enable the tray segment to articulate between a first position wherein the elongate material is stored and has a first length shorter than an actual length of the elongate material and a substantially flat second position, thereby extending a length of the elongate material disposed thereon. At least one safety stop that is operable to prevent extension of at least one of the plurality of tray segments to the second position.

DESCRIPTION OF THE EMBODIMENTS

The present disclosure relates generally to a mobile apparatus for hands free storage, transportation and deployment of electrical cables, ropes, hoses, or other items. Specifically, the present disclosure relates to a mobile mechanism which includes an apparatus for selectively retracting and extending electrical cables, ropes, hoses, and other items for example, thereon.

Certain situations require varying lengths of elongate material to perform various tasks at different locations within an area. For example, when drilling a borehole, it may be necessary to locate the drilling rig at various locations in series along a substantially straight line or in a cluster within a particular area or radius. In such cases, it is advantageous to have reliable and readily movable electrical power supply. It is even more advantageous if the power supply can be quickly deployed without requiring human effort to deploy or retract elongate material that is used to deliver power supply.

Figure 1:
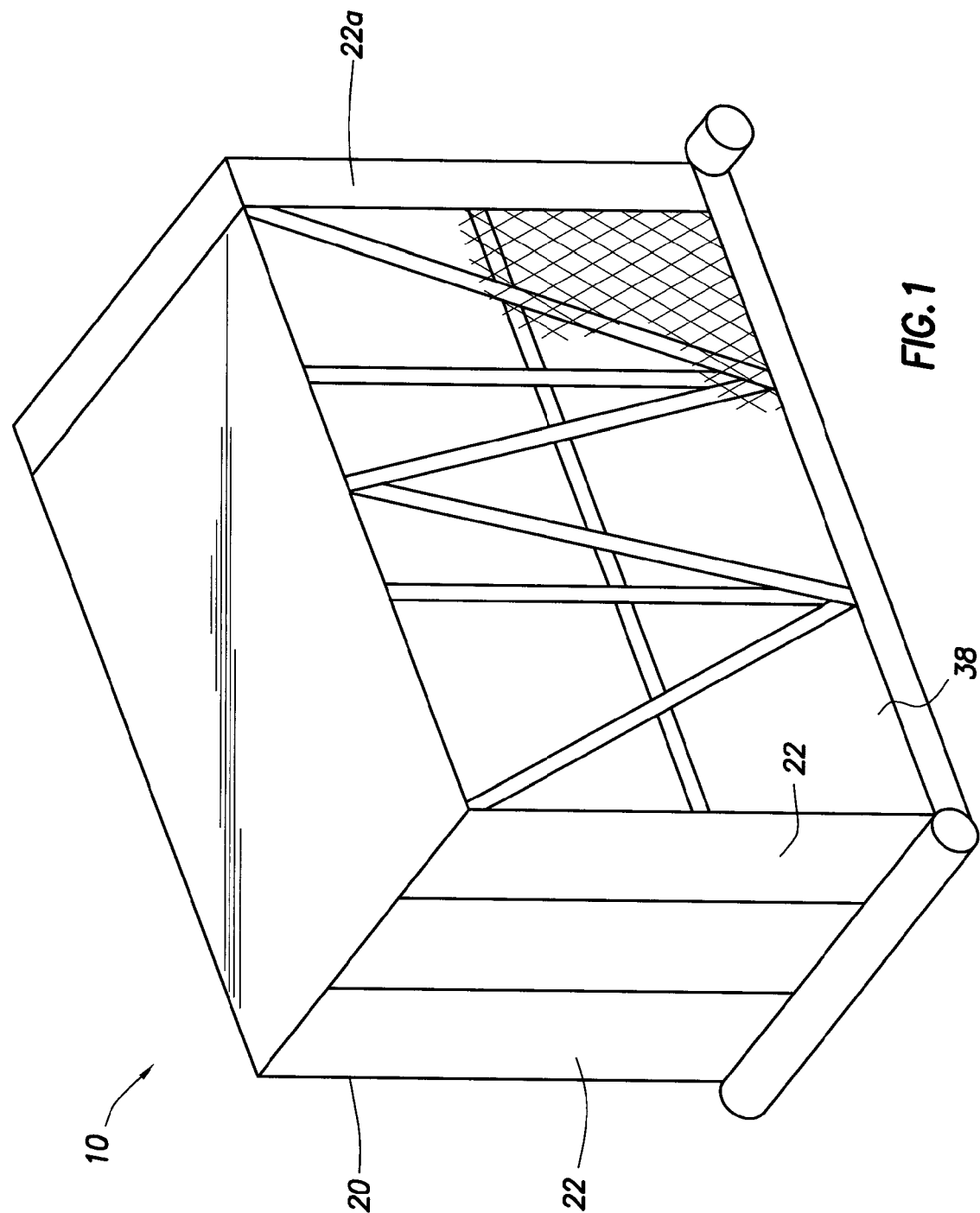
FIG. 1 illustrates an isometric view of a cable extension module of the present disclosure.

Turning now to FIG. 1, one embodiment of cable extension module 10 includes housing 20 that defines an enclosure 21. Housing 20 is manufactured to comply with international standards organization specifications such as ISO 830:1999 so that cable extension module 10 is easily transported in a standard shipping container. Housing 20 has a safety gate 22 that is provided to safely secure components of cable extension module therewithin.

In one embodiment, one or more motors such as an air drive motor 18 may be disposed within a first end 22a of housing 20 for use in retracting an extended cable extension module as will be explained in further detail below. In one embodiment a power source or electrical connection not shown may be disposed within first end 22a of housing 20.

Cable extension module 10 includes an anchor tray 23 having a bottom portion 23a that is fixed to a portion 21 of housing 20 near first end 22a and a second end 23b that is attached to a plurality of tray segments 24. Anchor tray 23 and tray segments 24 are adapted to retain at least a portion of elongate material thereon.

Figure 2:
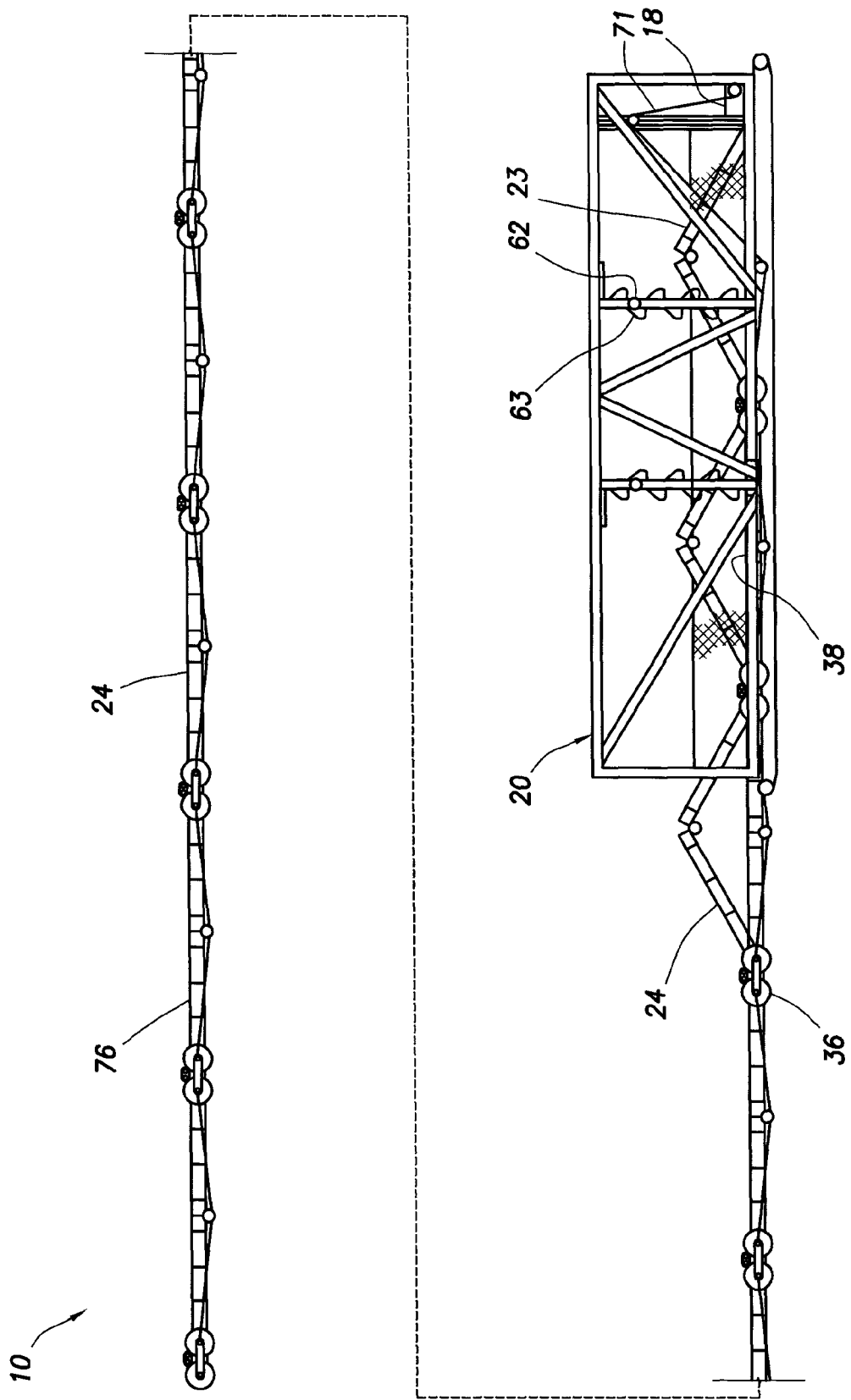
FIG. 2 illustrates the cable extension module of FIG. 1 with a portion of the cable partially extending from the housing.
Figure 3:
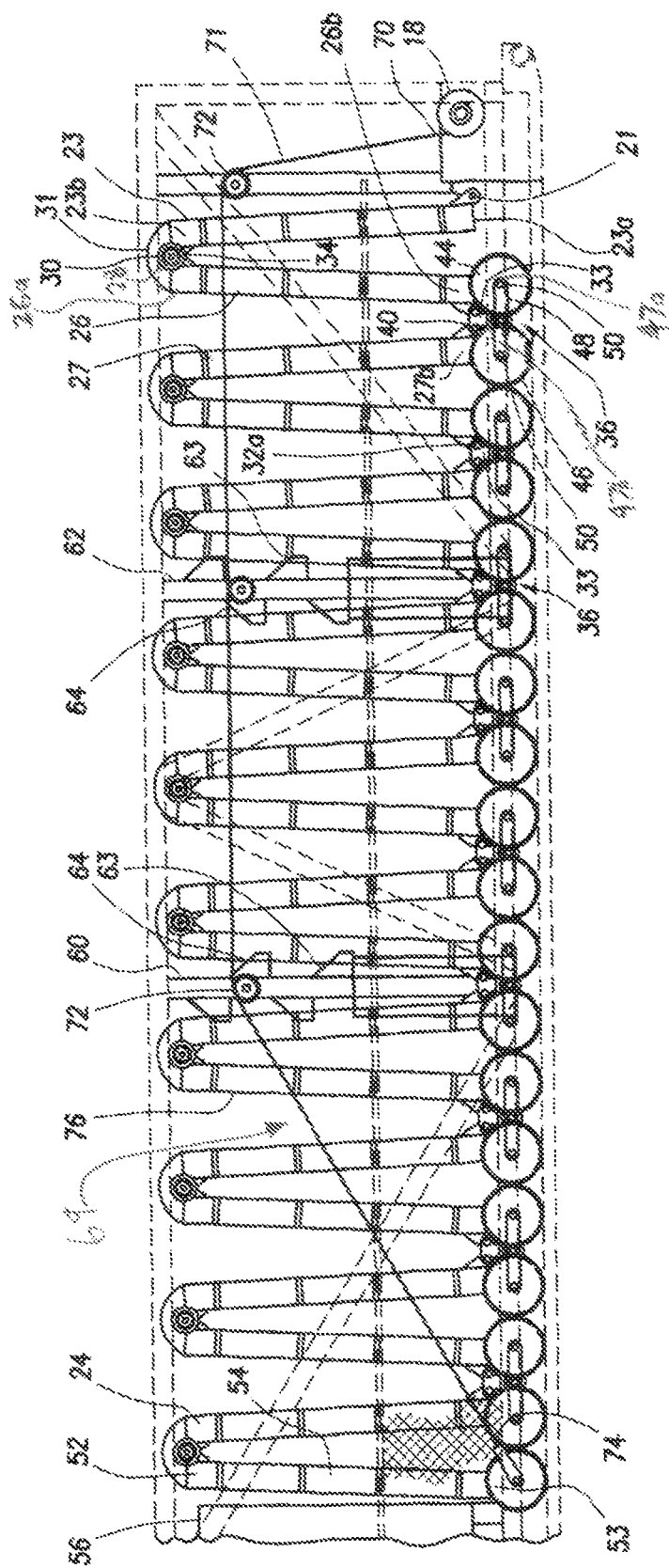
FIG. 3 illustrates another embodiment of the extension mechanism of the cable extension module of FIG. 1.

With continuing reference to FIGS. 2 and 3, each tray segment 24 includes first tray 26 and second tray 27. First end 26a of first tray 26 is attached to sheave 28. Sheave 28 is disposed on an axle 30. Top portion 23b of the anchor tray 23 is also attached to sheave 28, thereby forming an elbow 31 with first end 26a of first tray 26. Second end 26b of first tray 26 is attached to sheave 32a. A T-shaped plate 33 couples sheave 32a to wheel assembly 36 that is disposed on a floor 38 of the housing 20.

End 27b of second tray 27 is coupled to sheave 40, which is in turn coupled to wheel assembly 36 by T-shaped plate 33. Wheel assembly 36 includes a first and second wheels 44, 46 that are disposed at first and second portions 47a, 47b of rod 48. Wheels 44, 46 are adapted to rotate around axles 50. T-shaped plate 33 is attached to rod 48 and axles 50 are connected by rod 48.

As shown in FIGS. 2 and 3, a plurality of tray segments 24 are attached to tray 27 in series. In certain embodiments, any number of tray segments 24 may be attached to tray 27 to achieve the desired extendable length of cable extension module 10 as will be discussed below.

First portion 52 of distal tray 54 is attached to the tray segment 24 that is farthest away from anchor tray 23. Second portion 53 of distal tray 54 is also attached to a junction box 56 that carries one or more power outlets.

In one embodiment safety stops 60, 62 are provided within housing 20. Each safety stop 60, 62 includes wheel chocks 63 that extend therefrom. Safety stops 60, 62 are normally in an upright position when not in use and may be rotated 90 degrees toward floor 38 of housing 20 during use to prevent further extension of cable extension module 10 as will be discussed further below.

A cable pulley system 69 is provided within housing 20 to control the deployment and retraction of cable extension module 10. First end 70 of a cable 71 is attached to a drive motor 18 and wound around one or more pulleys 72 that are spaced along housing 20. Those of ordinary skill in the art will recognize that pulleys 72 can be spaced as far apart or as near to one another as necessary to effect varying degrees of control on cable extension module 10. Second end 74 of cable 71 is attached to distal tray 54. In a fully retracted position, cable extension module 10 is contained within housing 20 and can easily be transported by road, rail, sea or air.

In one embodiment, elongate material such as electrical cables 76 may be disposed on anchor tray 23, tray segments 24, and distal tray 54. As such the elongate material will assume a zig-zag profile of the tray segments, thereby enabling the cable extension module to provide an efficient way of storing elongate material in a fraction of the space that is ordinarily required to accommodate the full length of such material. Electrical cables 76 extend from first end 22a to junction box 56. In a further embodiment, the electrical cables my be pre-wired such that junction box 56 is electrically connected to a power source or electrical connection 19. In yet another embodiment, the elongate material may have free ends, thereby enabling a user to make one or connections that may be suitable for any given task or site conditions.

In operation in one type of terrain for example, an oilfield where there may be a need for electrical power at several locations, junction box 56 of cable extension module 10 is attached to a drilling rig as would be understood by those of skill in the art. An operator removes second end 74 of cable 71 from distal tray 54 thereby enabling tray segments 24 or cable extension module 10 to extend like an accordion. However, it is contemplated that unlike an accordion and as shown in FIG. 2, tray segments 24 are able to fully expand until the adjacent tray segments are substantially at a 180 degree angle relative to one another. In some embodiments, adjacent tray segments 24 lay substantially flat relative to floor 38 of housing 20.

It will be appreciated that when adjacent tray segments are substantially at a 180 degree angle from one another or laid flat relative to floor 38, elongate material or cables 76 disposed thereon which would have assumed a zig-zag folded position of the tray segments 24 are extended such that the cables 76 lay substantially flat on tray segments 24 thereby elongating the cables 76. In one embodiment a cable length of 154' can be retained on retracted tray segments in a housing 20 that is only 40' long. Those of ordinary skill in the art will recognize that the extension of cables 76 in the extended position of cable extension module 10 prevents the kinks and curls hitherto associated with elongate materials that are stored using previously known spooled and/or coiled methods of storing and transporting elongate material. Further, cable extension module 10 enables the use of virtually 100% of the length of cables 76 thereby reducing costs associated with buying additional cables to cover a given length. Further, because less cable is required to traverse a given length the storage weight and transportation costs of cable extension module 10 are significantly reduced compared to the weight and costs associated with the prior art.

Another advantage of cable extension module 10 is that cables 76 and other contents of housing 10 such as motor 18 are protected in covered housing 20 as shown in FIG. 1. It will also be appreciated that cable extension module 10 provides an operator the ability to control how much cable is dispensed by controlling the extension or payout of tray segments 24. In one embodiment, an operator may limit the extension or payout of cable extension module 10 to only the first one third portion of cable extension module 10 by activating safety stop 60. In use, an operator rotates safety stop 60 approximately 90 degrees toward floor 38 of housing 20. By so doing, chocks 64 prevent further rotation of wheel assemblies 36 that are located upstream of safety stop 60. Should the operator have a need to move junction box 56 to another location, the operator can rotate safety stop 60 back to its original (inactive) position and allow all tray segments 24 and anchor tray 23 to extend or rotate into the substantially flat position thereby extending cable extension module 10 and cables 76 disposed thereon to its full extent.

In another embodiment, the operator may elect to activate safety stop 62 by rotating safety stop 62 approximately 90 degrees toward floor 38 of housing 20 thereby limiting the payout or extension of cable extension module 10 to about two thirds of the full payout.

To retract cable extension module 10 back to its original storage position wherein tray segments 24 are disposed in a zig-zag position, an operator re-attaches cable 71 of the pulley system to distal tray 54 and one or more pulleys 72 and rotates one or more of any safety stops that may have been activated back to the upright position. The operator then activates air motor 18 to cause retraction of the trays segments 24. It will be appreciated by those of skill in the art that anchor tray 23 will first be retracted into its upright position and then each tray segment 24 attached thereto will be retracted to its upright position until distal tray 54 is retracted into its upright position and the entire cable extension module is within safety gate 22.

Another advantage of cable extension module 10 is that one embodiment of cable extension module 10 may be adapted to connect to one or more cable extension modules 10 may be connected in series to provide a length of cable to reach remote locations. In such embodiments, power source or electrical connection 19 is simply connected to junction box 56 of an adjacent cable extension module 10 in a "plug and play" fashion until the desired length of cable is achieved.

It is contemplated that the above-described cable extension module may be adapted for use with any kind of elongate material. For example, electrical cables may be replaced with fiber optic cables, water hoses, fluid conductors or any other type of elongate material.

It is also contemplated that cable extension module 10 may be utilized in any situation where there is a need to extend or retract any type of elongate material. For example, cable extension module 10 may be utilized to extend an elongate material to locations above ground level, underground, and even under the sea bed.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee.

What is claimed is:

1. A cable extension mechanism comprising:
a housing;
a plurality of cable tray segments adapted to retain elongate material therein, wherein each cable tray segment includes first and second cable trays;
a sheave disposed on an axle between the first and second cable trays thereby forming an extendable elbow;
at least one wheel assembly coupled to each cable tray segment to enable the tray segment to articulate between a first position wherein the elongate material is stored, and a first end of the elongate material is separated from a second end of the elongate material by a first length, the first length is shorter than an actual length of the elongate material and a substantially flat second position, wherein the first end of the elongate material is separated from the second end of the elongate material by a second length, the second length is longer than the first length; and
a pulley system that is operably controlled by an air pump to retract at least one of the tray segments.

2. The cable extension mechanism 1, further including a safety stop mechanism that is rotatable between an inactive position and an active position.

3. The cable extension mechanism of claim 2, wherein the safety stop mechanism includes one or more wheel chocks.

4. The cable extension mechanism of claim 3, wherein an anchor tray is coupled between the housing and the tray segments.

5. The cable extension mechanism of claim 3, wherein the tray segments can be partially extended by the pulley system.

6. The cable extension mechanism of claim 3, wherein a distal tray is coupled between one of the tray segments and a junction box.

7. The cable extension mechanism of claim 3, adapted to be articulated with an oil rig.

* * * * *